United States Patent [19]

Deschenes et al.

[11] 3,857,111

[45] Dec. 24, 1974

[54] SYLLABIC ADAPTATIVE DELTA MODULATION SYSTEM

[75] Inventors: Pierre A. Deschênes, Sherbrooke; Hubert Stephenne, Rock Forest; Michel Villeret, Sherbrooke, all of Quebec, Canada

[73] Assignee: Universite De Sherbrooke, Sherbrooke, Quebec, Canada

[22] Filed: Mar. 20, 1973

[21] Appl. No.: 342,945

[52] U.S. Cl. ............................. 332/11 D, 325/38 B

[51] Int. Cl. ............................. H03k 13/22

[58] Field of Search ....... 332/11 D, 11 R; 325/38 R, 325/38 A, 38 B; 178/66 R

[56] References Cited

UNITED STATES PATENTS

| | | | |
|---|---|---|---|
| 3,631,520 | 12/1971 | Atal | 325/38 B |
| 3,706,944 | 12/1972 | Tewksbury | 325/38 B |
| 3,729,678 | 4/1973 | Glasbergen et al. | 325/38 B |

*Primary Examiner*—Alfred L. Brody

[57] ABSTRACT

A syllabic adaptive delta modulation system including a modulator and a demodulator. The modulator comprises a comparator having a first input connected to receive an input analog signal, a second input adapted to be connected to an integrator located in the conventional feedback loop of the delta modulator and a quantizing means for sampling the output of the comparator to generate delta modulated binary pulses of one polarity or the other as determined by the comparator. A syllabic filter is connected to the output of the quantizing means for filtering the low frequency components of the delta modulated pulses and a multiplier is also connected to the output of the quantizing means and responsive to the syllabic filter for modulating the amplitude of the delta modulated pulses with the low frequency components detected by the syllabic filter. The integrator is connected to the output of the multiplier for integrating the amplitude modulated pulses. The output of the integrator is applied to the second input of the comparator for comparing the output signal of the integrator with the input analog signal and generating a signal depending upon the difference between the two signals.

9 Claims, 3 Drawing Figures

SYLLABIC ADAPTATIVE DELTA MODULATION SYSTEM

This invention relates to a syllabic adaptative delta modulation system including a modulator at one end of the line for modulating analog signals and a demodulator at the other end of the line for demodulating the signals so as to convert them back to analog signals.

Delta modulation is a known coding system used in communication to transform analog signals into digital signals for the transmission and reproduction of voice. It is characterized in that the pulses transmitted represent the variations of the amplitude of the analog signal and not its real amplitude. A delta modulation system is also characterized in that it is a closed loop system wherein the pulses generated are fed back to a local demodulator including an integrator and an amplifier connected to a comparator positioned at the input of the modulator. The output of the integrator is a signal made of a series of steps which are compared with the input analog signal to determine if the input analog signal has increased or decreased since the previous sampling time. When the amplitude of the steps generated by the amplifier is fixed, overload distortion or quantizing noise occur depending on whether the size of the steps is too large or too small as compared to the variations in amplitude of the analog signal. In order to overcome such drawbacks, it has been customary to vary the size of the steps with the variations in amplitude of the analog signal and this is called adaptation or companding.

There are two types of adaptive delta modulators. The first type is called instantaneous adaptive delta modulators and the second type is called syllabic adaptive delta modulators. In the instantaneous adaptive delta modulators the control of the gain of the amplifier located in the feedback loop is derived from the digital output pulses and considered on a short time basis. The information derived is fed to a logic block which in turn controls the gain of the feedback loop in discrete steps, that is the quantization steps $\sigma$ take a number of definite values.

There are two types of syllabic adaptive delta modulators depending on whether the gain control signal is derived from the analog input signal or from the coded digital signal appearing at the output of the modulator. When the gain control signal is derived from the input analog signal, the syllabic adaptive delta modulator is of the analog syllabic adaptive type and the gain control signal varies continuously. The control of the gain is thus an analog signal permitting a large range of variations of the values of the quantizing steps $\sigma$. In the case of the digital syllabic adaptive delta modulators, the gain is also varied continuously but the gain control signal is derived from the delta modulated pulses appearing at the output of the modulator by means of a syllabic filter.

It is the object of the present invention to provide a syllabic adaptive delta modulator of the last mentioned type which is very simple and permits to obtain a good quality adaptation for use in telephony.

The syllabic adaptive delta modulator, in accordance with the invention, comprises a comparator having a first input connected to receive an input analog signal, a second input adapted for connection to an integrator located in the conventional feedback loop of the delta modulator and a quantizing means for sampling the output of the comparator to generate delta modulated pulses. A syllabic filter is connected to the output of the quantizing means for filtering the low frequency components of the delta modulated pulses and a multiplier is also connected to the output of the modulating means and responsive to the syllabic filter for modulating the amplitude of the delta modulated pulses with the low frequency components detected by the syllabic filter. An integrator is connected to the multiplier for integrating the amplifier modulated delta pulses and the output of the integrator is applied to the second input of the comparator for comparing the output signal of the integrator with the input analog signal and generating a signal depending upon the difference between the two signals.

The syllabic filter may consist of a first low frequency filter of the single or double integration type followed by a full wave rectifier and a second low frequency filter of the signal integration type, or followed by a half wave rectifier and a second low frequency filter of the double integration type. The syllabic filter thus produces a pilot signal of low frequency which will be used to modulate the amplitude of the delta modulated pulses.

A DC signal may also be fed to the multiplier to improve the signal to noise ratio of the modulator at the low amplitudes of the analog input signals.

The demodulator located at the other end of the line is, as commonly known, similar to the local demodulator located in the feedback loop of the delta modulator. Consequently, such demodulator comprises an integrator followed by a multiplier and a low pass filter. A syllabic filter is connected in parallel with the integrator and the multiplier and adapted to detect the low frequency components of the delta modulated pulses. The output of the syllabic filter is connected to the multiplier so as to modulate the output of the integrator. This is obviously done to compensate for the modulation affected in the quantizer. The output of the multiplier is fed to a low pass filter to eliminate from the output of multiplier the high frequency components higher than the voice frequencies which may have been introduced by the modulator and the demodulator.

The invention will now be disclosed, by way of example, with reference to the accompanying drawings in which.

Figure 1:
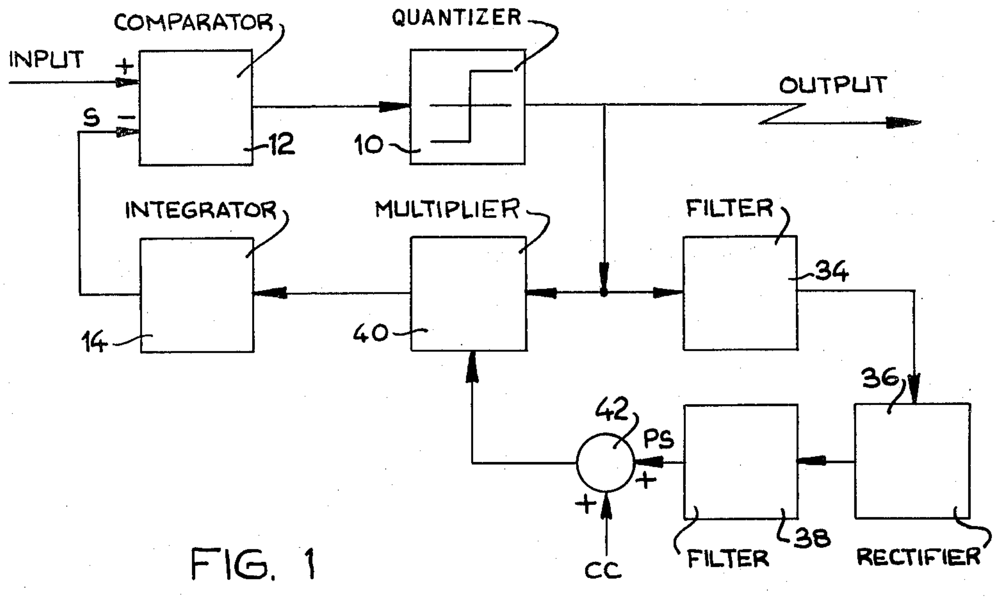
FIG. 1 illustrates a modulator in accordance with the invention.

Referring to FIG. 1, there is shown a delta quantizer having a quantizer 10 incorporating a clock (not shown), a comparator 12 and an integrator 14 of the same type as the one used in the well known delta modulators. The outputs of the modulator is fed to a syllabic filter including a first filter 34 which may be of the single or double integration type, and a full wave rectifier 36 followed by a second filter of the single integration type, or a half wave rectifier 36 followed by a second filter 38 of the double integration type. The output of the syllabic filter will thus produce a pilot signal of low frequency which will correspond to the amplitude variations of the analog input signal. Such pilot signal is fed to a pulse amplitude multiplier 40 located in the feedback loop of the modulator through adder 42. The multiplier 40 is connected to the output of the quantizer 10 for receiving the delta modulated pulses and, consequently, such delta modulated pulses will be modulated in amplitude by the pilot signal of low frequency appearing at the output of the syllabic filter. Since the output of the multiplier is applied to the integrator, it will be easily seen that such will automatically vary the value of the integration steps $\sigma$ of the integrator with the variations of the amplitude of the analog signal.

A source of DC voltage *cc* is also applied to adder 42 so as to improve the signal to noise ratio at the low amplitudes of the analog pilot signal.

The filter 34 may be a capacitive filter of the single integration type including a resistor connected in series with the line and a capacitor connected in parallel. It may also be a capacitive filter of the double integration type with prediction including a first resistor in series with the line a first capacitor in parallel across the line, a second resistor in series with the line a second capacitor in parallel with the line, and a third resistor in series with the line. The filter 34 is arranged to pass low component frequencies ($f_c < 100$ Hz). Such filters are well known in the art.

The filter 38 may also be of the single or double integration type as disclosed above. The cut-off frequency $f_{c1}$ and $f_{c2}$ are preferably about 120 Hz.

Figure 2:
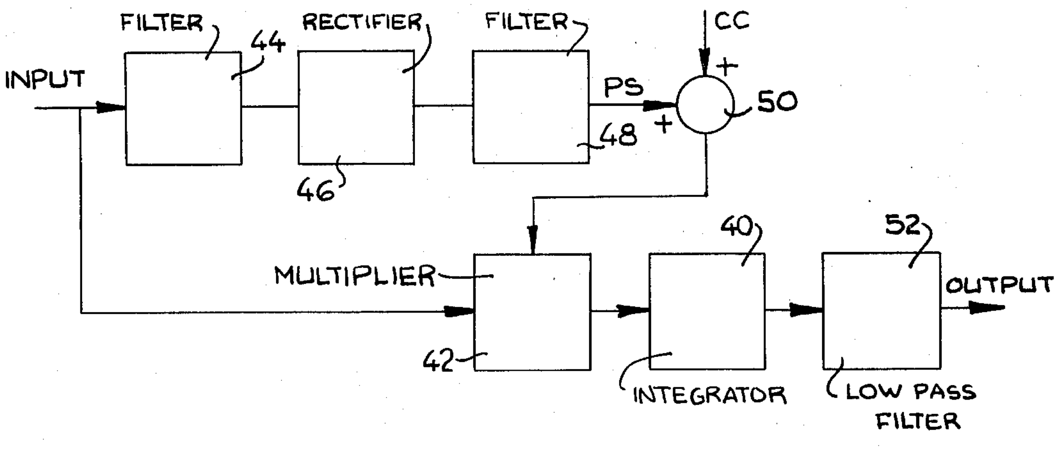
FIG. 2 illustrates a demodulator in accordance with the invention.

FIG. 2 of the drawings illustrates a demodulator for converting the output of the modulator of FIG. 1 back to its original analog value. The demodulator comprises an integrator 40 for integrating the input delta modulated pulses in known manner. The output of the integrator 40 is connected to a multiplier 42 to which is fed the output of a syllabic filter identical to the one of the modulator and including a first filter 44, a rectifier 46 and a second filter 48 through adder 50. The output of the syllabic filter 48 is a pilot signal which is applied to multiplier 42 to modulate the output of integrator 40 so as to reconstitute the original analog signal fed to the input of the modulator of FIG. 1. The output of the multiplier 42 is fed to a low pass filter 52 to pass the voice frequency components of the analog signal. A DC signal *cc* corresponding to the one of the modulator is also fed to the adder 50 for taking into consideration the DC signal fed into the modulator.

Figure 3:
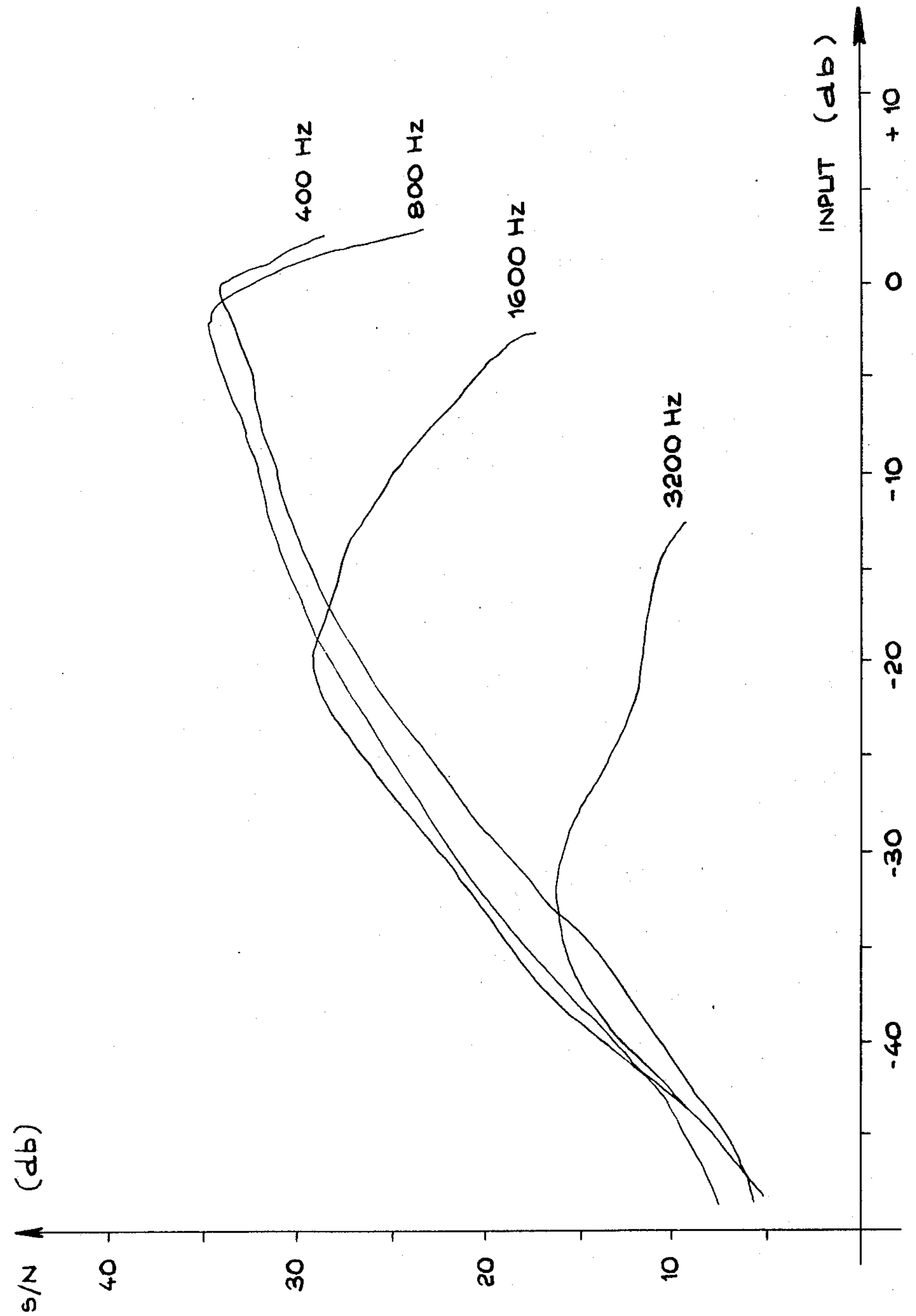
FIG. 3 illustrates various signal to noise ratio curves obtained for various tests signals versus the amplitude of such signals.

FIG. 3 illustrates various signal to noise ratio curves measured with various sinusoidal inputs shown as being 400, 800, 1600 and 3200 Hz, the sampling frequency being 56k Hz. The signal to noise ratio values are plotted versus input signals of increasing amplitude.

Although the invention has been disclosed with reference to a preferred embodiment thereof it is to be understood that various modifications may be made thereto and that the scope of the invention is to be limited by the following claims only.

We claim:

1. A syllabic adaptive delta modulator comprising:

a. a comparator having a first input, a second input and a single output, an analog signal being fed to said first input;

b. quantizing means for sampling the output signal of said comparator to generate delta modulated pulses having low frequency components;

c. a syllabic filter connected to the output of said quantizing means for filtering the low frequency components of said delta modulated pulses;

d. a multiplier connected to the output of said quantizing means and responsive to said syllabic filter for modulating the amplitude of said delta modulated pulses with the low frequency components detected by the syllabic filter; and e. an integrator connected to said multiplier for integrating the amplitude modulated delta pulses, the output of said integrator being applied to the second input of said comparator for comparing the output signal of the integrator with the input analog signal and for generating a signal depending upon the difference between the two signals.

2. A syllabic adaptive delta modulator as defined in claim 1, wherein said syllabic filter consists of a first low frequency filter, of a full wave rectifier connected to the output of said first low frequency filter, and of a second low frequency first order type filter connected to the output of said full wave rectifier.

3. A syllabic adaptive delta modulator as claimed in claim 2, wherein said first low frequency filter is of the single integration type.

4. A syllabic adaptive delta modulator as defined in claim 3, wherein the cut-off frequency of said first low frequency filter is smaller than 100 Hz and wherein the cut-off frequency of said second low frequency filter is approximately equal to 120 Hz.

5. A syllabic adaptive delta modulator as defined in claim 1, wherein the said syllabic filter consists of a first low frequency filter, of a half wave rectifier connected to the output of said first low frequency filter, and of a second low frequency second order type filter connected to the output of said half wave rectifier.

6. A syllabic adaptive delta modulator as defined in claim 5, wherein said first low frequency filter is of the single integration type.

7. A syllabic adaptive delta modulator as defined in claim 6, wherein the cut-off frequency of said first filter is 100 Hz whereas the cut-off frequencies of said second low frequency filter are approximatively 120 Hz.

8. A syllabic adaptive delta modulator as defined in claim 5, wherein said first low frequency filter is of the double integration type with prediction.

9. A syllabic adaptive delta modulator as defined in claim 1, wherein the integrator is of the single integration type.

* * * * *